United States Patent [19]

Healy

[11] 4,418,869

[45] Dec. 6, 1983

[54] HOSE MOUNTED FLUID MIXING SPRAYER

[76] Inventor: James W. Healy, 54 Plymouth Rd., Wakefield, Mass. 01880

[21] Appl. No.: 225,208

[22] Filed: Jan. 15, 1981

Related U.S. Application Data

[63] Continuation-in-part of Ser. No. 78,246, Sep. 24, 1979, abandoned.

[51] Int. Cl.³ .............................................. B05B 7/30
[52] U.S. Cl. .................................. 239/317; 239/323; 137/101.11; 137/218; 137/564.5
[58] Field of Search ............... 239/310, 317, 323, 313; 137/218, 564.5, 101.11; 222/630, 95

[56] References Cited

U.S. PATENT DOCUMENTS 2,646,063  7/1953  Hayes .................................. 137/218
3,042,314  7/1962  Packard et al. ................. 239/310 X

FOREIGN PATENT DOCUMENTS 2453512  9/1976  Fed. Rep. of Germany ... 137/564.5
727492   4/1955  United Kingdom ................ 239/313
936956   9/1963  United Kingdom ............. 137/564.5

Primary Examiner—Joseph J. Rolla
Assistant Examiner—Frederick R. Handren
Attorney, Agent, or Firm—W. R. Hulbert

[57] ABSTRACT

A hose mounted fluid mixing dispenser has a fluid containing bladder inside a bottle. A bottle cap fitting the bottle has a water hose connection, a water passage having a rectilinear portion and a nozzle with an adjustable metering device for introducing fluid from the bladder into the water stream as it passes through the rectilinear portion. A removable plug in the cap permits filling of the bladder. An anti-syphon device is incorporated in the hose connecting portion of the cap. Water fills the space between the bladder and the bottle as the bladder empties, providing a pressure differential to impel fluid into the stream.

2 Claims, 3 Drawing Figures

HOSE MOUNTED FLUID MIXING SPRAYER

This application is a continuation-in-part of my application Ser. No. 78,246, filed Sept. 24, 1979, which application is abandoned.

FIELD OF THE INVENTION

The invention relates to a hose-mounted fluid dispenser for adding variable amounts of fluid, such as liquid chemicals, e.g., fertilizer, to a stream of water from a hose.

BACKGROUND OF THE INVENTION

Fluid dispensers have been used to mix a liquid chemical into the flow of water from a hose. The chemical, which might be a fertilizer or an insecticide, can then be sprayed on lawns, plants, and bushes.

Some fluid dispensers are mounted on the spraying end of a hose. These are usually aspiration devices in which a suction tube is used to draw the chemical out of a hose-mounted container and add it to the water stream (e.g., U.S. Pat. Nos. 3,042,314 and 2,991,939). Because of the suction action of these devices, the attitude of the aspiration dispenser is critical to its proper operation. Any tilting of the device might cause the liquid chemical to flow away from and expose the intake end of the suction tube. Suction would be lost, and the chemical flow would diminish or cease altogether. A further drawback of these dispensers is that the spray pattern of the hose nozzle cannot be adjusted during operation. The aspiration devices cannot tolerate the temporary back pressure caused by such an adjustment, and water may enter the chemical container and dilute the chemical therein.

An improvement on the above described aspiration devices embodies the use of a flexible bladder for containing the liquid chemical mounted in a bottle in such a way that liquid pressure may be applied between the exterior of the bag and the interior of the bottle to force the chemical into a stream of water to be there entrained and sprayed from a nozzle (e.g., U.S. Pat. Nos. 2,153,240 and 3,220,435). So far as I am aware, in this type of prior art device the proportions of chemical to water are not readily adjustable nor necessarily constant with varying water pressures. A further disadvantage of such systems as that of U.S. Pat. No. 2,153,240 resides in the fact that when the sprayer is turned off the system remains undesirably pressurized to the line pressure of the water supply.

Still another alternate type of dispenser is the compression sprayer. This device includes a large tank which holds the premixed chemicals and water. The tank, however, is expensive and because of its size is difficult to transport and store. As a result, the compression sprayer is not an acceptable alterative to the hose-mounted dispenser, particularly for those applications which would require infrequent and limited spraying.

SUMMARY OF THE INVENTION

It is a principal object of the invention to provide an easily-transported fluid dispenser for accurately adding variable amounts of an additive e.g., liquid chemicals, fertilizers, etc., to a stream of water from a hose, which dispenser adds the selected amount of additive independently of changes in line pressure, amount of flow or the attitude of the dispenser. It is also an object of the invention to provide such a fluid dispenser which can add to the flow any ratio of water-to-chemical within a given range.

In accordance with the invention, I provide a sprayer having means for attaching it to the neck of a bottle or the like comprising: a hollow body defining a water inlet passage for connection to a water supply under line pressure, a rectilinear mixing passage and an outlet passage from the mixing passage to a nozzle; adjustable metering means adjacent and in communication with the mixing passage; a bladder located below and in communication with the metering means for containing a fluid additive to be metered by the metering means into the water stream in the said mixing passage, the bladder being adapted to be inserted within the bottle when the sprayer is attached thereto so as to define, with the bottle's interior wall, an enclosed space; means for supplying water under line pressure from the inlet passage to the enclosed space; and means for reducing the pressure within the body and the enclosed space to that of the atmosphere when the water supply to said inlet passage is turned off and for restoring to and maintaining line pressure therein when said water supply is turned on.

In preferred embodiments: the metering means comprises a movable member having a series of apertures of predetermined size and the novel sprayer includes means for placing only a preselected one of those apertures in communication with the mixing passage at a time; the movable member comprises an apertured ring integral with a sub-assembly insertable within the hollow body and the said sub-assembly is provided with means for manually rotating it to place the desired metering aperture in communication with the mixing passage; the manually adjusting means comprises a funnel shaped portion of the sub-assembly extending upwardly from the apertured metering ring and above the hollow body and the sub-assembly includes stopper means in the bottom of the funnel shaped portion for closing and opening the mouth of said bladder permitting, when open, the filling of the bladder with a desired additive without removing the sprayer from the neck of the bottle; means are provided for bleeding off air from the said enclosed space as it fills with water; the hollow body defines a pair of arcuate water passages which pass around opposite sides of the metering ring, one of the passages having a rectilinear portion comprising the said mixing passage, whereby water entering from the inlet passage is divided into two streams which diverge at and pass around either side of the metering ring and converge beyond it prior to entering the outlet passage; the sprayer includes a manually operable valve in the inlet passage for controlling the flow of water passing therethrough and a support within the bladder to hold it in extended condition when empty to facilitate its insertion into and removal from the bottle; the means for reducing and restoring pressure within the body and the enclosed space comprises, in combination, a vent to atmosphere from the said inlet passage and flexible closure means responsive to differential pressure within the inlet passage for closing the vent when water supply is turned on and for opening the vent when the water is turned off.

More specifically, a presently preferred embodiment of the invention comprises, in a hose-mounted fluid mixing dispenser, wherein a fluid contained in a flexible bladder mounted in a bottle is introduced into a stream of water by pressure differential produced by feeding water from the stream inlet into the space between the bladder and the inner wall of the bottle, the improvement wherein all the working parts are part of a bottle cap assembly, the asembly comprising an inlet sub-assembly, a mixing sub-assembly and a nozzle sub-assembly, all the said sub-assemblies being mounted on a body which is connectable to the neck of the bottle. In this form of the invention, the inlet sub-assembly includes: a hose connector, an inlet passage to conduct liquid entering through the hose connector to the mixing sub-assembly and valve means for controlling the entry of the liquid. The mixing sub-assembly includes: a generally annular passageway from the inlet passage to divide the liquid into two streams which rejoin each other near the nozzle sub-assembly, the passageway having a rectilinear portion in which at least one of the streams flows in a straight line, and adjustable means located within the annulus defined by the passageway for metering a controlled flow of the said fluid from the bladder into the said rectilinear portion, whereby the fluid will be entrained by the liquid during its straight line flow. And the nozzle sub-assembly includes: a discharge passage in communication with the outlet from the mixing sub-assembly and a spray head to receive and dispense the combined stream from the discharge passage.

The just described form of the invention may, and preferably does, include one or more of the following features: means in the inlet sub-assembly establishing communication between the interior of the dispenser and atmosphere when the water supply to the inlet assembly is turned off and for preventing such communication when the water supply is turned on; the said body defines both the annular passageway and a central bore communicating with the interior of the bladder and the adjustable means comprises a metering unit insertable into the bore from the top, including an apertured metering ring rotatable with the unit to place a selected one of its apertures in communication with the rectilinear portion of the passage, the interior of said ring being in communication with the interior of the bladder to meter fluid therefrom in to the stream of water in the rectilinear portion of the passage; removable stopper means in the metering unit located above the metering ring which, when in place, prevents leakage of fluid from the bladder and which, when removed, establishes access to the bladder for filling purposes.

Still further objects, features and advantages of the invention will become apparent from the following non-limiting detailed description, taken in conjunction with the accompanying drawings, of a presently preferred embodiment thereof.

DETAILED DESCRIPTION OF PREFERRED EMBODIMENT

Figure 2:
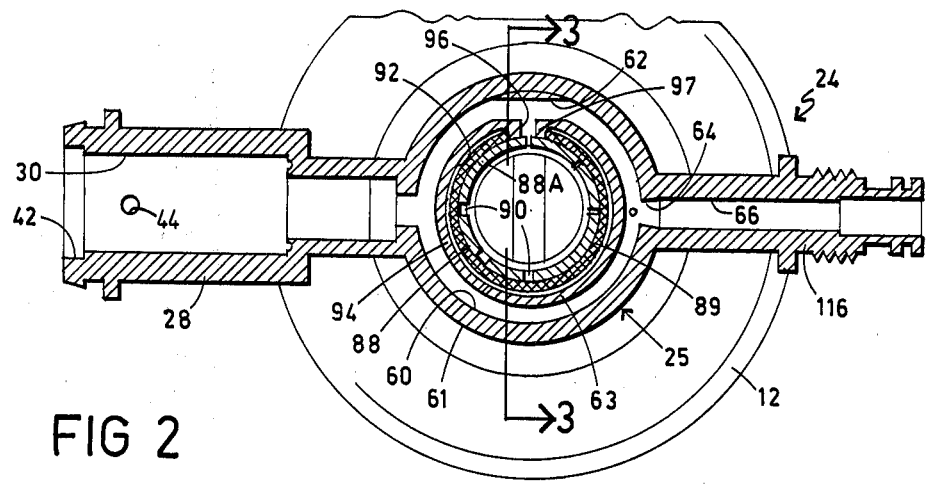
FIG. 2 is a horizontal section taken on line 2—2 of FIG. 1, with some of the parts removed more clearly to reveal the fluid passages in the bottle cap.

Referring to the drawings, the invention is shown as embodied in a bottle cap assembly, indicated generally by the numeral 10, attachable to a bottle 12, made of any suitable material such as plastic or glass, by means of a connecting portion having internal threads 14 engaging external threads 16 on the bottle neck 18.

Figure 1:
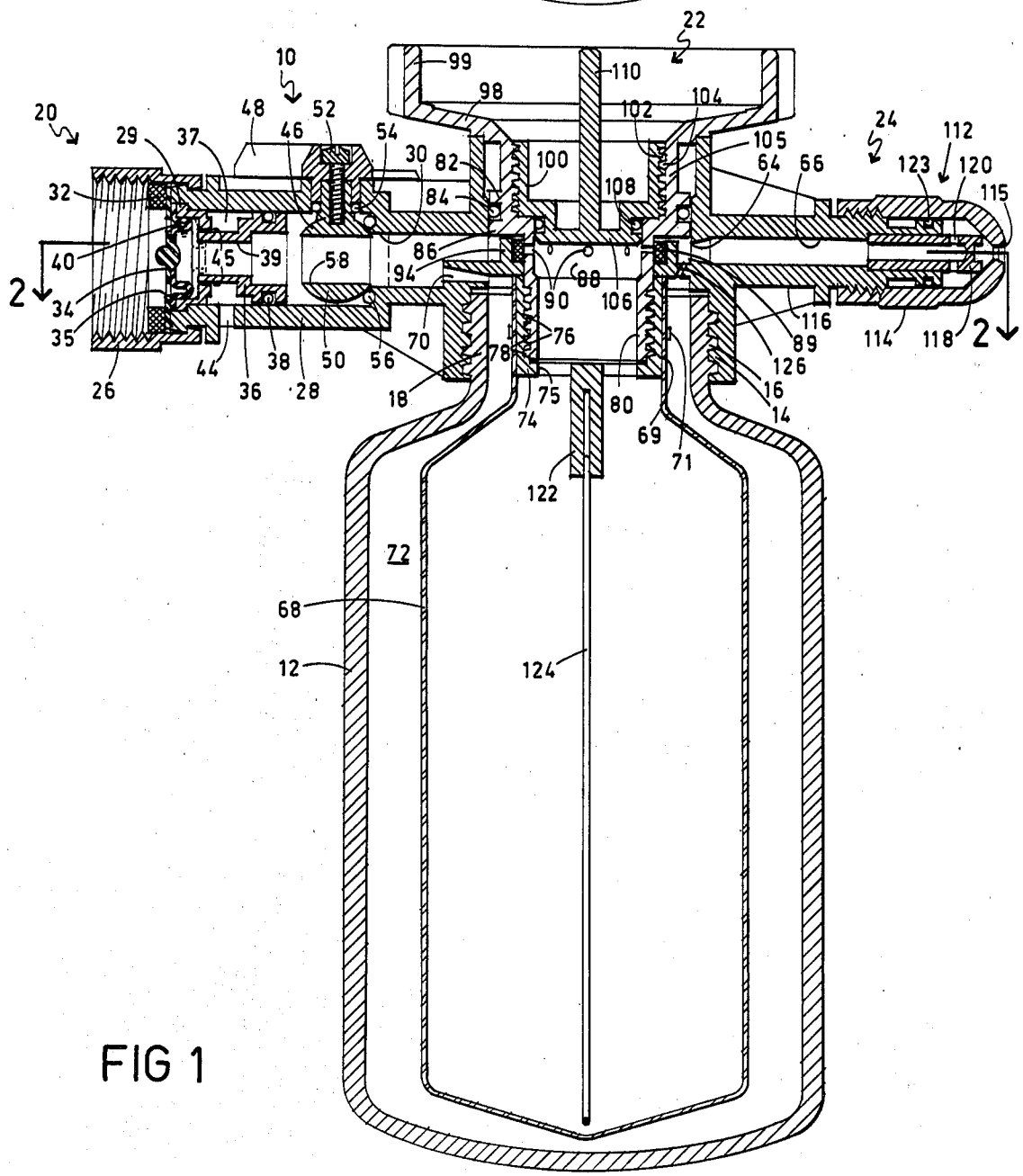
FIG. 1 is a vertical section through a hose-mountable, fluid dispenser according to the invention.

The bottle cap assembly 10 contains, or has attached thereto, all the needed working parts of the novel device. These include the inlet sub-assembly 20, on the left as seen in FIG. 1, the fluid mixing sub-assembly 22, at the center, and the nozzle sub-assembly 24, at the right. All three comprise part of or are insertable in unitary body 25 (FIG. 2). The body 25 is formed to provide tubular inlet 28 (which defines the passage 30 and supports or houses the components which comprise the inlet sub-assembly 20); the exterior wall defining the annular passage 60 for the liquid in the mixing sub-assembly and the means for mounting the other mixing components in the unit; and tubular outlet 116 which holds the nozzle sub-assembly. Each sub-assembly will be described in turn.

The inlet sub-assembly 20 comprises a female hose connector 26, adapted for connection to an ordinary garden hose (not shown). The connector is mounted on the inlet end of tubular extension 28 of the body 25 which extends to the left, as seen in FIG. 1, from the mixing sub-assembly 22. The tube 28 defines a passage, indicated generally by the numeral 30, at the outer end of which is the hose-connecting fitting 26 and within which anti-syphon and shut-off valve means are mounted. A conventional hose washer 32 fits within the connector 26. Immediately inboard of the washer 32 are fitted a plastic disc 34 having apertures 35 and, adjacent to it, neoprene anti-syphon valve member 40 for a purpose which will be described. Mounted within the inlet passage 30 is apertured cylindrical plastic body 36. Its central opening provides an inlet passage 39 for the stream of water entering from the hose. The upstream end of the body has a portion 29 which seats in seat 42 at the entrance to the passage 30 and the other end of the body is suitably sealed by O-ring 38. The body 36 defines with the wall of passage 30 an annular channel 37 which is sealed off from the water passage except through openings 45. Axial water inlet passage 39 discharges into the downstream portion of passage 30. The annular channel 37 is vented to atmosphere through port 44 in tubular inlet 28. Port 44 communicates with the passage 39 just within its inlet end through apertures 45 defined by radially inwardly stepped portions of the body 36.

The functon of the flexible neoprene valve member 40 will now be apparent. When water flows into the device from the hose connector its force will flex the valve member away from the ports 35 in the disc 34 as indicated by broken lines in FIG. 1 so that the water may enter the inlet passage 39. Simultaneously it closes off openings 45, correspondingly sealing off the interior of the unit from the atmosphere with which it otherwise would communicate through port 44 and the openings 45. If, at a time when the nozzle is not completely closed off, the water supply is turned off, the pressures on both sides of the flexible valve member 40 will equalize by reason of communication to the atmosphere through the nozzle 112. Because of the "memory" characteristic of the material, this valve member will return to its original configuration, blocking opening 35 from back-flow to the hose connector from within the passage 39 while simultaneously opening the interior of the device to atmosphere through openings 45 and port 44. In the event that the water supply is turned off at a time when the nozzle is also shut off, pressure will temporarily remain in the body 25 because the valve member is still pressed against vented opening 45 by the remaining internal pressure. The body 36 is held tightly in place whenever a hose is connected to the connector 26 since the rim of the male connector seats on the hose washer 32 which, in turn, presses the shoulder 29 into seat 42.

The combination of elements 34 and 40 is part of a standard hose connection for a nozzle, model 573-TF-C, sold by Gilmour Manufacturing Co. division of R. M. Smith, Inc., of Somerset, Pa.

Still further downstream in the passage 30 is mounted a ball valve 46 which may be opened and closed by turning handle 48 through 90° in either direction. The purpose of this valve is positively to turn off the water supply to the device when desired. The ball valve 46, comprising spherical stopper 50 having internal passage 58, is held in place by machine screw 52, sealed by O-rings 54, 56 and operated by handle 48. Thus, when the valve is open, water, under normal line pressure from a garden hose, may be admitted to the sprayer through the passages 39 and 30 from which it exits to the fluid mixing sub-assembly.

Downstream of the valve 46, as best seen in FIG. 2, the water stream divides, one portion flowing through arcuate passage 60 of the mixing assembly and the other portion flowing through passage 62, which is provided with a rectilinear portion, as shown, toward the nozzle end of the sprayer. The passages are defined by inner and outer walls 94 and 61 respectively. The confluence of the divided streams is indicated by the numeral 64 from whence the combined stream may exit toward the nozzle through passage 66.

Within the bottle 12, when the bottle cap assembly is in place, is located flexible bladder 68. A passage 70 formed in the body 25 establishes communication between inlet passage 30 and the space 72 between the bladder 68 and the inner wall of the bottle 12. When the device is connected to a source of water under pressure, the entering liquid not only passes through the device to the nozzle end but also enters this space 72 to exert a force on the exterior of the bladder 68. Since the pressure in passage 62 during liquid flow will be less than that at the entrance to opening 70 sufficient differential of pressure will exist to exert a squeezing force on the outside of the bladder 68.

The mixer sub-assembly 22 includes the filler and metering components which comprise a unit, insertable into body 25 from the top and be mated with the bladder retainer which is connected to it from the bottom. This filler and metering unit comprises a unitary member 98 the upper portion 99 of which forms a knob for rotatably adjusting the metering system as well as a funnel for filling the bladder 68 with chemical additive. Below the funnel-shaped portion 99 the member 98 is reduced in diameter to define a cylindrical portion 105 which is provided with internal threads 104 to hold a separately removable rotatable stopper 100 having a plug portion 106. The stopper member 100 is provided with a handle 110 which permits it to be installed by manually screwing it into place, utilizing threads 102 and 104, and to be correspondingly removed to permit filling of the of bladder 68 through funnel-shaped knob 99. The stopper, when in place, is sealed to the body 98 by O-ring 108.

Cylindrical portion 105 of member 98 is provided with outwardly projecting annular shoulders 82 and 86 defining a channel to receive O-ring seal 84. The lower shoulder 86 rotatably seats on the top of wall 94 of the body 25 to prevent further downward movement.

Just below the just described reduced diameter portion of the body 98 a still further reduced cylindrical portion is formed which comprises an apertured metering ring 88 integral with the main body 98 so as to be manually rotatable by handle or knob portion 99. The ring 88 is provided with a series of radially directed metering apertures 90 of varying diameters to permit the user to select the desired flow rate for injecting additive into the water stream. As best seen in FIG. 2, the passages 60 and 62 are defined by outer and inner concentric walls 61 and 94, respectively, formed in the main body 25. Wall 94 of body 25 defines with ring 88 of body 98, when assembled, and annular space 92 within and concentric with passages 60, 62. Snapped into space 92, prior to assembly, is spacer 89 which is in the form a split plastic sealing ring. This ring surrounds the metering ring 88 and seals off all of its apertures 90 save the one which is located opposite the port 96 which establishes communication between the interior of metering ring 88 and the rectilinear passage 62. The ends of split sealing ring 89 terminate against shoulder 97 on either side of port 96.

The lower end of the mixer assembly body 98, below the metering ring 88, comprises a cylindrical depending projection 80 provided with external threads 78. These threads are arranged to mate with corresponding internal threads 76 on ring-like bladder connector 74. At the bottom of connector 74 is formed an inwardly projecting annular shoulder 75 which may seat against the rim of cylindrical threaded projection 80.

Figure 3:
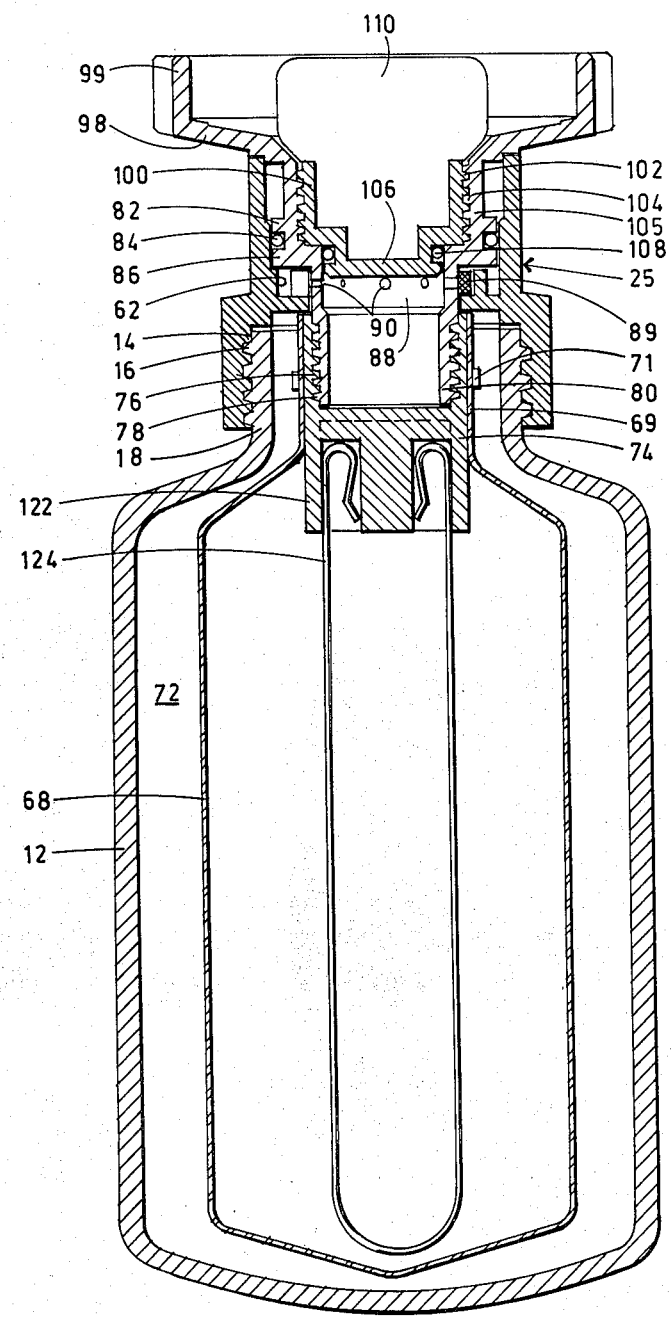
FIG. 3 is a vertical section taken on line 3—3 of FIG. 2.

Across the vertical internal passage in threaded projection 80 is formed a web 122 which may be molded integrally therewith and which extends downwardly therefrom. Held in the web are the two ends of wire 124, which is in the form of a long narrow loop extending within and to the bottom of the bladder 68 (FIG. 3). The bladder 68 is held to the external surface of connector 74 by the resiliency of its neck 69 or by a rubber band 71, or both. The connector is assembled to mixer body 98 by threads 76, 78. The thus assembled device is then attached to bottle 12, the bladder 68 being inserted in the bottle in doing so. The wire 124 not only prevents the bladder from total collapse when empty but, since it will hold it extended under these conditions, facilitates its insertion through the narrow bottle neck 18. It will be seen that when connector 74 is fastened to depending portion 80 they, and the parts located above them, including metering ring 88 can be revolved as a unit by turning knob 99 without loosening any of the screwed together parts from each other, thus adjusting the metering ring to select the port 90 of desired size for the particular spraying operation.

The interior of the metering ring 88 is in direct communication with the interior of the bladder 68 through the interior of cylindrical projection 80. When it is turned by knob 99 a selected one of the openings 90 is placed in communication with the opening 96 (FIG. 2) which leads into the passage 62 in which the water is subjected to straight line flow. Access to the bladder 68 for filling purposes is had by removing the closure member 100. This is accomplished by revolving handle 110 to disengage external threads 102 and internal threads 104 in the unitary member 98.

The nozzle assembly 24 comprises the portion of the main body which includes tubular projection 116 which has within it the discharge passage 66 the upstream end of which is in communication with the confluence 64 of the outlets of passages 60, 62. Projection 116, at its downstream end, carries, removably mounted, a spraying head 112. This head is of any suitable known construction and arrangement of parts. In the embodiment shown, cap 114 is threaded to the end of the projecting tubular portion 116 for adjustment endwise by manual rotation. Contained within cap 114 is spray element 118. It will be seen that endwise adjustment of member 114 serves to vary the distance between its inwardly turned end portions, which define the spray opening 115, and the element 118, thereby controlling spray flow from the sprayer. The flow path from the outlet passage 66 is through the openings 120, thence to the nozzle outlet 115. The cap 114 is sealed to the exterior of the tubular projection by O-ring 123.

Means are also provided to vent air from the space 72 as it fills with water through opening 70. For this purpose there is provided a small diameter hole 126 venting to the confluence of the streams where the exit ends of passages 60, 62 join each other.

OPERATION

In order to use the sprayer of the invention, with the bladder preassembled to the connector 74 and the latter screwed to the depending portion 80 of the mixer subassembly and the entire bottle cap assembly then attached to the neck of the bottle 12, the bladder is first filled with the desired chemical, such as liquid fertilizer. This is done by removing the stopper member 100 by disengaging threads 102, 104 by means of handle 110. The upwardly projecting portion 99 of body 98 now can act as a funnel to assist in the filling operation. When the bladder has been filled the stopper assembly is then replaced and a garden hose connected to the connector 26. Knob 98 is rotated to cause a preselected metering aperture 90 in metering ring 88 to register with port 96 thus to establish communication between the interior of the bladder 68 and the rectilinear passage 62. When the water is turned on and the valve 46 opened, liquid streams are established through passages 39, 30, 60, 62 and 66 to the nozzle. Opening 45 which vents passage 39 to atmosphere is closed by flexible valve member 40. Because of pressure differential between space 72 and passage 62, as above described, additive from within the bladder is forced by the pressure differential through the selected opening 90 into the stream of water. Fineness of spray and spray volume are controlled by rotating cap 114. Opening 96 may be completely closed by rotating ring 88 so that blank portion 88A thereof blocks it off. When the water supply to the hose connector 26 is turned off, the pressure within the body 25 promptly drops to that of the atmosphere, the neoprene valve member flexes away from opening 45 and closes opening 35, thus preventing syphoning back into the hose.

It has been found that the construction and arrangement of parts according to the invention provides much improved control over the ratio of chemical to water discharged by the sprayer, even with substantial fluctuation of water pressure, than in prior art arrangements. One reason for the improvement in performance appears to lie in the fact that the adjustable metering ring is located so as to discharge chemical directly into the stream of water at a location where the stream is flowing in a straight line rather than through an arc.

While there has herein been disclosed and described a presently preferred embodiment of the invention it will nevertheless be understood that the same is susceptible of modification and change by those skilled in the art and, therefore, it is intended that the scope of the invention be limited only in accordance with the proper interpretation to be accorded the appended claims.

I claim:

1. A sprayer having means for attaching it to the neck of a bottle comprising
   a hollow body defining a water inlet passage for connection to a water supply under line pressure, a rectilinear mixing passage and an outlet passage from said mixing passage to a nozzle,
   adjustable metering means adjacent and in communication with said mixing passage,
   said metering means comprising an apertured ring integral with a sub-assembly insertable within said hollow body and having a series of metering apertures of predetermined size,
   said sub-assembly being provided with means for manually rotating said sub-assembly to place a desired metering aperture in communication with said mixing passage,
   a bladder located below and in communication with said metering means for containing an additive to be metered into the water stream in said mixing passage through said metering means, said bladder being adapted to be inserted within said bottle when said sprayer is attached thereto so as to define with the interior surface of said bottle an enclosed space,
   means for supplying water under line pressure from said inlet passage to said enclosed space, and
   means for reducing the pressure within said body and said enclosed space to that of the atmosphere when said water supply is turned off and for restoring to and maintaining said pressure at line pressure when said water supply is turned on,
   said means for manually rotating said sub-assembly comprising a funnel shaped portion of said sub-assembly extending upwardly from said apertured ring and above said hollow body and including removable closure means in the bottom of said funnel shaped portion for closing and opening the mouth of said bladder permitting, when removed, the filling of said bladder with a desired additive without disconnecting said sprayer from said bottle.

2. A sprayer as claimed in claim 1 wherein said hollow body defines a pair of arcuate water passages which pass around opposite sides of said metering ring, one of said passages having a rectilinear portion comprising said mixing passage, whereby water entering from said inlet passage is divided into two streams which diverge at and pass around either side of said ring and converge beyond it prior to entering said outlet passage.

* * * * *